UNITED STATES PATENT OFFICE.

CARL FREIHERR AUER von WELSBACH, OF VIENNA, AUSTRIA-HUNGARY.

MANUFACTURE OF ELECTRIC FILAMENTS.

1,090,111.     Specification of Letters Patent.     Patented Mar. 10, 1914.

No Drawing.     Application filed November 25, 1903. Serial No. 182,683.

*To all whom it may concern:*

Be it known that I, CARL FREIHERR AUER VON WELSBACH, of iv Wiedner-Hauptstrasse 57, Vienna, and Rastenfeld, Austria-Hungary, chemist, have invented certain new and useful Improvements in the Manufacture of Electric Filaments, of which the following is a specification.

This invention relates to a method of making filaments for incandescent electric lamps from osmium and highly refractory oxids. Filaments of this kind have been obtained heretofore by methods involving the step of mechanically mixing the components.

Osmium and highly refractory oxids, as for example, oxid of thorium, combine under certain conditions to form conductors whose conductivity decreases progressively in proportion to the increase of the percentage of oxid. In consequence of the importance—from the technical point of view—of this class of glowing filaments, I have thoroughly investigated the same and I have found that their properties vary in a considerable measure according to the degree of subdivision of the particles of the mixture of osmium and of the refractory oxids and this variation is the more favorable for the production of light the finer these substances are divided and the more molecular or the more intimate their mixture is.

According to the present invention the desired condition of finest division, that is to say a molecular mixture, may be obtained by precipitating the components from their solutions by means of a precipitant common to the components. On the other hand, mixtures of osmium and of refractory oxids, even if the same are ground as finely as possible, always remain more or less heterogeneous.

Contrary to the well known mechanical mixtures molecular mixtures of osmium and of oxids obtained as above described form entirely homogeneous conductors, so that by their mere appearance they are distinguishable from the former. For example, mixtures of osmium and of oxid of thorium mechanically mixed in the proportion of their equivalent-weights of 3:1.25 even after having been exposed to the highest glowing temperature always produce filaments, which in the cold are of a dark gray color, whereas molecular mixtures prepared in the same proportions and according to this present invention produce nearly silver-white filaments of a pure metallic appearance.

I am aware that it has been proposed in the manufacture of electric incandescent bodies to treat solutions of the components of the filaments with a precipitant common to these components and to glow the precipitate in order to obtain an intimate mixture of the components—but in these processes it is not proposed to convert one of these components into a metal, but merely to produce oxids; hence it was not to be concluded that in this same way an intimate mixture of a metal with a refractory oxid might be obtained, showing qualities of pure metals.

The process of manufacture of filaments of the described kind may be carried out as follows: For example, an acidulated solution of an osmium-salt, as for instance, osmate of potassium or a solution of osmic acid, is intimately mixed with a solution of a salt of those elements, the oxids of which are to be admixed to the osmium, as for example nitrate of thorium, or of zirconium, or of other similar elements; this mixture is then treated with hydrosulfuret of ammonia as a common precipitant. Osmium is thereby separated as sulfid of osmium and thorium and the other elements are separated as hydrates. The precipitate thus obtained is washed with water containing hydrosulfuret of ammonia, then dried and strongly heated in a reducing gas under exclusion of air. The resulting product is thereafter finely ground in an agate-mill, or in a similar apparatus, and finally made up into filaments in the manner well known to the art from numerous publications made by me among which may be mentioned British Patent No. 1535 of the year 1898. In order to increase plasticity of the paste as well as the conductivity of the filaments, it is advisable to admix with the paste some pure lamp black. The heating of the filament to incandescence in the electric current for the purpose of giving final cohesion and uniformity to the filament takes place in the absence of gaseous carbon compounds; for this purpose a mixture supersaturated with steam and composed of about 3 parts of nitrogen and 1 part of hydrogen will be best suitable.

The accompanying drawing illustrates a lamp filament embodying my invention.

What I claim as my invention and desire to secure by Letters Patent, is:

1. The method of making filaments for incandescent lamps, which consists in precipitating from a solution, by means of a common precipitate, material reducible to metal and refractory oxid, highly heating the precipitate in a reducing atmosphere until the reduction to metal and refractory oxid is obtained, and finally forming the mass into filaments; substantially as described.

2. The method of making filaments for incandescent lamps, which consists in precipitating from a solution, by means of a common precipitant, material reducible to osmium and refractory oxid, highly heating the precipitate in a reducing atmosphere until the reduction to osmium and refractory oxid is obtained, and finally forming the mass into filaments; substantially as described.

3. The method of making filaments for incandescent lamps, which consists in precipitating from a solution, by means of a common precipitant, material reducible to osmium and refractory oxid, washing and drying the precipitate, highly heating the same in a reducing atmosphere until the reduction to osmium and refractory oxid is obtained, and finally forming the mass into filaments; substantially as described.

4. The method of making filaments for incandescent lamps, which consists in precipitating from a solution, by means of a common precipitant, material reducible to osmium and refractory oxid, washing and drying the precipitate, highly heating the same in a reducing atmosphere until the reduction to osmium and refractory oxid is obtained, and finally forming the mass into filaments; substantially as described.

5. The method of making filaments for incandescent lamps, which consists in treating a solution containing a salt of osmium and a salt of a refractory oxid metal with hydrosulfuret of ammonia, highly heating the resultant precipitate in a reducing atmosphere until it is reduced to osmium and refractory oxid, and finally forming the mass into filaments; substantially as described.

6. The method of making filaments for incandescent lamps, which consists in treating the solution containing a salt of osmium and a salt of a refractory oxid metal with hydrosulfuret of ammonia, highly heating the resultant precipitate in a reducing atmosphere until it is reduced to osmium and refractory oxid, mixing the precipitate with a relatively small quantity of lamp black, and finally forming the mass into filaments; substantially as described.

7. The method of making filaments for incandescent lamps, which consists in treating a solution, containing a salt of osmium and a salt of a refractory oxid metal, with hydrosulfuret of ammonia, thereby obtaining sulfid of osmium and a hydrate of the refractory oxid metal, highly heating the resulting precipitate in a reducing atmosphere until the sulfur is driven off from the osmium and the hydrogen from the hydrate, grinding the heated precipitate, and finally forming the mass into filaments; substantially as described.

In witness whereof I have hereunto signed my name this 10th day of November 1903, in the presence of two subscribing witnesses.

CARL FREIHERR AUER von WELSBACH.

Witnesses:
 ALVESTO S. HOGUE,
 KARL HILTF.